United States Patent [19]

Lamont et al.

[11] Patent Number: 4,701,491
[45] Date of Patent: Oct. 20, 1987

[54] SILICONE EXTRUSION STOCK

[75] Inventors: Peter Lamont; Carl M. Monroe; Olgerts Skostins, all of Midland, Mich.

[73] Assignee: Dow Corning Corporation, Midland, Mich.

[21] Appl. No.: 923,466

[22] Filed: Oct. 27, 1986

[51] Int. Cl.$^4$ ................................................. C08K 3/34
[52] U.S. Cl. ..................................... 524/493; 524/588; 524/847
[58] Field of Search ........................ 524/493, 847, 588

[56] References Cited

U.S. PATENT DOCUMENTS

| | | | |
|---|---|---|---|
| 2,721,857 | 10/1955 | Dickmann | 260/46.5 |
| 3,070,560 | 12/1962 | Metevia | 260/29.1 |
| 3,734,882 | 5/1973 | Talcott | 260/37 |
| 4,010,136 | 3/1977 | Blizzard et al. | 260/37 |
| 4,122,247 | 10/1978 | Evans | 528/14 |
| 4,361,655 | 11/1982 | Tyler | 521/47.5 |
| 4,551,515 | 11/1985 | Herberg et al. | 528/18 |

Primary Examiner—Melvyn I. Marquis
Attorney, Agent, or Firm—Edward C. Elliott

[57] ABSTRACT

A method of producing an improved extruding silicone rubber stock consists essentially of mixing together a polydiorganosiloxane having a Williams Plasticity Number of from 125 to 180 and a get slope activity of less than 25 and a reinforcing silica filler having a surface area of greater than 150 $m^2/g$ and a hydrophobic surface from a silane treatment to give a stock which has a Garvey rating of greater than 3.5 at an extrusion rate of 20 rpm.

5 Claims, No Drawings

SILICONE EXTRUSION STOCK

BACKGROUND OF THE INVENTION

1. Field of the Invention

This invention relates to silicone elastomer stock which has improved extrusion characteristics.

2. Background Information

One of the uses of silicone elastomer stock is extrusion into elastomeric shapes. The ability to be extruded into the desired shape without excessive die swell and with smooth faces and edges is a desirable characteristic. Little has been taught concerning means for improving extrudability of silicone rubber stocks other than methods of improving the handling of silicone stocks.

U.S. Pat. No. 2,721,857, issued Oct. 25, 1955, teaches organopolysiloxane rubber stocks having improved handling characteristics. These stocks consist essentially of an organopolysiloxane having from 1.99 to 2.0 inclusive radicals on silicon, 0.005 to 0.09 part by weight of a boron compound, filler, and vulcanizing agent.

U.S. Pat. No. 3,070,560, issued Dec. 25, 1962, teaches improved handling stocks comprising polydiorganosiloxane endblocked with either $R_3Si$- or $R'O$-groups, treated silica filler, hydroxylated siloxane, and boron compound.

U.S. Pat. No. 3,734,882, issued May 22, 1973, teaches improved handling properties and improved processability by adding organic titanate to the composition of polydiorganosiloxane gum and reinforcing filler.

U.S. Pat. No. 4,010,136, issued Mar. 1, 1977, to Blizzard et al. discloses that when a small amount of polytetrafluoroethylene powder is mixed with certain curable polydiorganosiloxane compositions and the resulting mixture is extruded, the resultant article has a greatly reduced amount of porosity and a smoother surface.

U.S. Pat. No. 4,361,655, issued Nov. 30, 1982, to Tyler discloses that the addition of from 1 to 10 percent of particulate vulcanized silicone rubber added to unvulcanized silicone rubber gives improved processing; i.e., faster rates.

None of these references is directed to a method of improving the extrudability of silicone stocks as measured by their ability to make smooth surfaced extrusions in the shape of acute angles as found in a Garvey die.

After the discoveries leading to this invention were known, other prior art became of interest.

U.S. Pat. No. 4,122,247, issued Oct. 24, 1978, to Evans teaches that it is preferred that there be less than 10 parts per million of water present in cyclic siloxanes used to make polymers. He states that if there is substantially more than this amount of water present in the cyclic siloxanes, then the desired low molecular weight oil or high molecular weight gum will not be formed in commercially attractive yields. Removal of all but traces of water is accomplished by heating to 110° C. or above with a nitrogen purge.

U.S. Pat. No. 4,551,515, issued Nov. 5, 1985, to Herberg et al. teaches that during the polymerization of polydiorganosiloxanes, the mixture of methyl tetramer and chain stopping agent is preferably passed through a drying means. The reason that it is desirable to pass the reactants through drying means to eliminate water which will terminate or chainstop diorganopolysiloxane polymer with silanol groups and thus reduce the viscosity of the polymer and change the nature of its interaction with a filler.

SUMMARY OF THE INVENTION

A method of improving the extrudability of a silicone rubber stock has been discovered. The method produces the improved stock by mixing a polydiorganosiloxane gum having a low activity with a treated silica filler having a hydrophobic surface.

DESCRIPTION OF THE INVENTION

This invention relates to a method of producing a silicone rubber stock which gives an improved extrusion, as measured by a Garvey die, consisting essentially of mixing together ingredients comprising (A) 100 parts by weight of polydiorganosiloxane of the formula

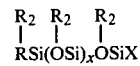

where R is selected from the group consisting of methyl, ethyl, vinyl, propyl, and 3,3,3-trifluoropropyl, X is R or a hydroxyl radical, x is such that the Williams Plasticity Number is from 125 to 180, and the gel slope activity of the polydiorganosiloxane is less than 25, and (B) from 20 to 75 parts by weight of reinforcing silica filler having a surface area of greater than 150 m²/g and a silane surface treatment, and is hydrophobic, to give a stock which has a Garvey rating of greater than 3.5 at an extrusion rate of 20 rpm.

One of the important uses of silicone elastomers is their use as extruded shapes, for example gaskets for oven doors. In order for a silicone elastomer stock to be useful in such applications, the stock must be able to be extruded into whatever shape is desired. Some gaskets have complicated shapes, including small openings and sharp angles. A method of evaluating the usefulness of a stock is through the experimental evaluation of the stock, using a Garvey die. This is a die, as specified in ASTM D 2230, that includes a narrow angle. By evaluating the various ingredients that make up a silicone rubber stock and their effect upon the ability to produce a smooth, narrow edge with a Garvey die, it was discovered that the polydiorganosiloxane used in the stock should have a Williams Plasticity Number of from 125 to 180. Williams Plasticity Number is defined in ASTM D 926. The polydiorganosiloxane should also have a gel slope activity of less than 25. Gel slope activity is a test, which is further described below, to determine the degree to which a given polymer will react with a colloidal silica in a composition to cause crepe aging when the stock shelf ages by measuring the relative amount of hydroxyl radical remaining in the polymer after its manufacture. The extrudability of a composition was found to be related to the gel slope activity of the polymer used.

The reinforcing silica used in a stock was also found to relate to the extrudability. Colloidal silica having a surface area of greater than 150 m²/g was found useful where the surface had a silane treatment and was rendered hydrophobic.

Through selection of a polymer having the specified properties and a filler having the specified properties, stocks can be compounded which have greatly improved extrudability as compared to stocks produced from polymer and/or filler not meeting the specified criteria.

Polydiorganosiloxane (A) suitable for use in the method of this invention can be obtained by selectively choosing from available lots of commercially produced gums. As is well known, the viscosity of the gum is controlled by the amount of endblocker that is added to the composition during the polymerization step. The amount of endblocker is chosen so that the resulting gum has the desired Williams Plasticity Number of from 125 to 180. Adding more endblocker lowers the viscosity or Williams Plasticity Number. The gel slope activity of the polymer can be lowered by following the teaching of U.S. Pat. No. 4,551,515, issued Nov. 5, 1985, to Herberg et al. which is hereby incorporated by reference to show a method of producing polydiorganosiloxane having a lower amount of silanol groups.

Additional means of producing polydiorganosiloxane having a lower silanol content, and therefore a lower gel slope activity may be found in U.S. patent application Ser. No. 923,468 Entitled, "*Neutralization of Catalyst in Polymerization of Polydiorganosiloxane*", by Leo Stebleton, filed concurrently with the instant application and owned by the same assignee. This invention relates to a method of neutralizing the catalyst used in the alkaline polymerization of polydiorganosiloxane in which the neutralizing agent is a composition of the formula $R'_3SiOC(O)R''$, where $R''$ is a hydrocarbon radical of from 1 to 6 carbon atoms inclusive and $R''$ is a hydrocarbon radical of from 1 to 8 carbon atoms inclusive. Preferred is dimethylvinylsilylacetate. This application is hereby incorporated by reference to show a method of producing polydiorganosiloxane having a lower amount of silanol groups and therefore a lower gel slope activity.

The amount of hydroxyl endblocking left in the polymer is judged by an activity test in which a sample of the polymer is dissolved in toluene, then mixed with ethylorthosilicate crosslinker and dibutyltindiacetate catalyst. This mixture is placed in a viscosity tube at a temperature of 25° C. and the viscosity measured at 10 minutes after catalyzation and at 20 minutes after catalyzation. The viscosity at the two times is then plotted on a chart and the slope of the line is determined. The procedure is repeated and the average of the two slopes is reported as the activity of the polymer. The higher the activity number, the more hydroxyl radical is present in the polymer to be reacted with the crosslinker.

The reinforcing silica filler used in this invention is a colloidal silica having a surface area of greater than 150 $m^2/g$ that has a hydrophobic surface due to a surface treatment with a silane. The preferred silane is dimethyldichlorosilane. The colloidal silica can be any of the well known materials used as reinforcement in silicone elastomers. In order to be reinforcing, it is generally accepted that the surface area of the colloidal silica must be at least 150 $m^2/g$. When the surface area is between about 150 $m^2/g$ and about 200 $m^2/g$, the amount of treatment on the surface of the colloidal silica is critical. Above about 200 $m^2/g$ of surface area, the amount of treatment does not appear to be critical. Within this range the preferred amount of treatment is that which gives a carbon content of from about 1.0 to 1.3 percent by weight, based upon the total weight of the treated filler. Such treated colloidal silicas are commercially available, for example, R-974V from Degussa A G and H25P from Wacker Chemie.

When a polydiorganosiloxane gum and a reinforcing silica filler are mixed together, they ordinarily interact to produce a gelled structure or crepe which is very difficult to work with. In order to prevent this interaction, a plasticizer is added. Commonly used is a short chain hydroxy endblocked polydimethylsiloxane. Any of the commonly used plasticizers are suitable for use in this invention, but the amount necessary is smaller than that usually used because of the reduced activity of the gum and because of the treatment on the filler. A preferred amount of plasticizer is from about 1.0 to 2.5 parts by weight of plasticizer per 10 parts by weight of reinforcing silica filler.

The stock can also contain the usual additives for silicone elastomers such as heat stability additives, compression set additives, pigments, catalysts, and extending fillers. Because the extending fillers are commonly added in substantial quantities, the effect of such additions on the extrudability of the stock should be evaluated.

Stocks produced following the teaching of this invention give very smooth extrusions and are therefore useful in producing insulated wire, gaskets, spacers, and all such linear articles produced by use of an extruder to shape the stock before vulcanization.

The following examples are included for illustrative purposes only and should not be construed as limiting the invention, which is properly set forth in the appended claims. All parts are parts by weight.

EXAMPLE 1

A series of compositions were prepared in which the polydimethylsiloxane had a range of activities to illustrate the effect upon the extrudability while using a single filler with each composition.

In each case 100 parts by weight of polydiorganosiloxane gum having about 0.14 mol percent vinyl radicals and the rest methyl radicals with dimethylvinylsiloxy endblockers and a Williams Plasticity of about 150 was used. The different gums had different gel slope activities as is shown in Table I. The gum was mixed with 5 parts of hydroxyl endblocked polydimethylsiloxane fluid having a viscosity of about 0.04 Pa.s at 25° C. and about 4 weight percent silicon-bonded hydroxyl radicals as a plasticizer, and 35 parts by weight of treated filler. The treated filler was a purchased colloidal silica that had a surface area of about 180 $m^2/g$, a pH of about 4.1, and a carbon content of about 1.17 percent by weight, that had been treated with dimethyldichlorosilane. The gum and plasticizer were placed in a mixer and heated while mixing in the filler. The ingredients were mixed until uniform and cooled. This base, 100 parts, was then mixed with 1.2 parts of catalyst paste of 50 percent 2,4-dichlorobenzoyl peroxide in polydiorganosiloxane fluid to give a stock.

The relative extrudability of uncured stocks was determined by a test based upon the Garvey die described in ASTM 2230. A stock is softened and extruded through a Garvey die in a Davis-Standard 2.5 inch extruder. The resultant extrusion is rated on a 1 to 4 scale with 1 being poor and 4 being excellent. In this case, the 30 degree edge of the extrusion is rated as the most critical measurement with 1 being a saw tooth edge, 2 having many nicks, 3 having some nicks, and 4 having no nicks, the edge being perfectly sharp. This is a comparative test which compares a series of stocks in which the extrusion conditions are held constant, the only variable being the stock being extruded.

Each of the stocks was also pressed into sheets, vulcanized, post cured for 4 hours at 200° C. and measured for physical properties, with the results shown in Table I. Durometer was measured in accordance with ASTM D 2240, tensile strength and elongation in accordance with ASTM D 412, and plasticity in accordance with ASTM D 926.

TABLE I

| Sample | 1 | 2 | 3 | 4 | 5 | 6 |
|---|---|---|---|---|---|---|
| Polymer Activity | 0.0 | 18.9 | 25.5 | 38.4 | 49.8 | 56.8 |
| Extrusion Rating* | 1.6 | 2.7 | 2.0 | 2.0 | 2.0 | 2.0 |
| Plasticity Number | 262 | 244 | 239 | 229 | 224 | 244 |
| Durometer | 51 | 51 | 50 | 50 | 48 | 49 |
| Tensile Strength, MPa | 7.2 | 7.6 | 5.9 | 7.2 | 7.2 | 7.0 |
| Elongation, percent | 404 | 535 | 430 | 483 | 494 | 456 |

*average of 5 and 10 rpm

The data in the table shows that the polymer having an activity of 18.9 (sample 2) was significantly better at extruding than the others. The polymer having an activity of 0.0 (sample 1) was manufactured by a different means and had a plasticity number of about 188 while the other polymers all had a plasticity of about 165.

EXAMPLE 2

A series of bases were prepared to compare the effect of different types of treated colloidal silica filler.

In each case, 100 parts of the polymer of Example 1 having an activity of 18.9 was mixed with 35 parts of the colloidal filler shown in Table II and the parts of plasticizer shown in Table II. Mixing was as in Example I. Each stock was evaluated as in Example 1 with the results shown in Table II.

TABLE II

| Sample | 7 | 8 | 9 | 10 | 11 | 12 | 13 |
|---|---|---|---|---|---|---|---|
| Plasticizer, parts | 5 | 4 | 4 | 4 | 5 | 5 | 6 |
| Filler | | | | | | | |
| Starting silica | A | A | A | A | B | B | B |
| surface area, m²/g | 180 | 179 | 182 | 185 | 198 | 207 | 202 |
| carbon, percent | 1.17 | 1.54 | 1.25 | 0.86 | 1.56 | 1.72 | 1.22 |
| Extrusion Rating* | 2.7 | 1.7 | 3.7 | 3.9 | 1.9 | 2.7 | 1.5 |
| 20 rpm | 3.4 | 1.9 | 3.8 | 3.8 | 3.3 | 3.5 | 3.2 |
| Plasticity Number | 244 | 244 | 262 | 297 | 254 | 290 | 259 |
| Durometer | 51 | 51 | 53 | 56 | 53 | 56 | 55 |
| Tensile Strength, MPa | 1108 | 1084 | 1109 | 1093 | 1214 | 909 | 871 |
| Elongation, percent | 535 | 502 | 447 | 422 | 410 | 321 | 311 | starting silica A had surface area of about 200 m²/g
starting silica B had surface area of about 255 m²/g
*average of 5 and 10 rpm Samples 7 through 10 show that the amount of treatment can be critical in obtaining good extrusions in that there can be too much treatment, as in sample 8. A different silica, having a higher surface area, as in samples 11 through 13 does not appear to be as critical.

That which is claimed is:

1. A method of producing a silicone rubber stock which gives an improved extrusion, as measured by a Garvey die, consisting essentially of mixing together ingredients
    (A) 100 parts by weight of polydiorganosiloxane of the formula

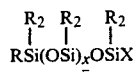

where R is selected from the group consisting of methyl, ethyl, vinyl, propyl, and 3,3,3-trifluoropropyl, X is R or a hydroxyl radical, x is such that the Williams Plasticity Number is from 125 to 180, and the gel slope activity of the polydiorganosiloxane is less than 25, and
    (B) from 20 to 75 parts by weight of reinforcing silica filler having a surface area of greater than 150 m²/g and a silane surface treatment, and is hydrophobic,
to give a stock which has a Garvey rating of greater than 3.5 at an extrusion rate of 20 rpm.

2. The method of claim 1 in which there is also present sufficient plasticizer to give shelf life to the stock.

3. The method of claim 2 in which the plasticizer is present in an amount of from 1.0 to 2.5 parts by weight per 10 parts by weight of filler (B).

4. The method of claim 1 in which the reinforcing silica has a surface area of from greater than about 150 m²/g to about 200 m²/g.

5. The method of claim 4 in which the silane surface treatment gives a carbon content of from about 1.0 to 1.3 percent by weight, based upon the total weight of the treated filler.

* * * * *

UNITED STATES PATENT AND TRADEMARK OFFICE
CERTIFICATE OF CORRECTION

PATENT NO. : 4,701,491

DATED : October 20, 1987

INVENTOR(S) : Peter Lamont, Carl Monroe, and Olgerts Skostins

It is certified that error appears in the above-identified patent and that said Letters Patent is hereby corrected as shown below:

Column 3, line 28, after "where", remove R" and replace with R'.

Claim 1, line 4, after "ingredients", add ---comprising---.

Signed and Sealed this

Tenth Day of May, 1988

Attest:

DONALD J. QUIGG

Attesting Officer

Commissioner of Patents and Trademarks